United States Patent
Walker, Sr. et al.

(10) Patent No.: US 6,186,528 B1
(45) Date of Patent: Feb. 13, 2001

(54) WHEELCHAIR AND TRAILER SYSTEM

(76) Inventors: David W. Walker, Sr.; Janice Walker, both of 23593 First St., New Caney, TX (US) 77357

( * ) Notice: Under 35 U.S.C. 154(b), the term of this patent shall be extended for 0 days.

(21) Appl. No.: 09/133,451

(22) Filed: Aug. 13, 1998

(51) Int. Cl.$^7$ .................................................. B62K 27/00
(52) U.S. Cl. .................... 280/204; 280/304.1; 280/304.5
(58) Field of Search ................. 280/204, 304.1, 280/292, 304.5, 288.4, 250.1, 33.992, 442

(56) References Cited

U.S. PATENT DOCUMENTS

| | | | |
|---|---|---|---|
| 2,168,147 | * | 8/1939 | Arehart ................................. 280/442 |
| 2,268,064 | * | 12/1941 | Straus .................................... 280/442 |
| 2,605,114 | * | 7/1952 | Ronning ................................ 280/442 |
| 4,037,853 | * | 7/1977 | Sparks ................................... 280/204 |
| 5,054,800 | * | 10/1991 | Christensen et al. ................. 280/204 |
| 5,123,668 | * | 6/1992 | Ligas .................................... 280/204 |
| 5,330,217 | * | 7/1994 | McCarthy ............................. 280/204 |
| 5,769,440 | * | 6/1998 | Jones .................................... 280/204 |
| 5,785,334 | * | 7/1998 | Robinson .............................. 280/204 |
| 5,794,957 | * | 8/1998 | Mendon ................................ 280/204 |
| 5,829,771 | * | 11/1998 | Hsu ....................................... 280/204 |

* cited by examiner

Primary Examiner—J. J. Swann
Assistant Examiner—Michael Cuff

(57) ABSTRACT

A wheelchair and trailer system comprising a trailer which has a planar support in a generally rectangular configuration. The trailer has a front edge, a rear edge and two side edges. Also provided is a forwardly extending rod with an aperture therethrough for positioning over the hole of the wheelchair. It also has an associated pin to selective effect the coupling between the trailer and the wheelchair. Two rear wheels are provided for rotation about a common horizontal axis coupled to the trailer adjacent to the rear edge. A front wheel is provided for rotation about a horizontal axis coupled to the trailer adjacent to the front edge. The front wheel is secured to the forwardly extending rod to allow rotation of the front wheel about a vertical axis for steering purposes.

1 Claim, 3 Drawing Sheets

WHEELCHAIR AND TRAILER SYSTEM

BACKGROUND OF THE INVENTION

1. Field of the Invention

The present invention relates to a wheelchair and trailer system and more particularly pertains to rolling a trailer coupled to a wheelchair.

2. Description of the Prior Art

The use of trailers of various designs and configurations is known in the prior art. More specifically, trailers of various designs and configurations heretofore devised and utilized for the purpose of pulling trailers and other devices through various methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,305,601 to Berge discloses a Shopping Cart for the Handicapped. U.S. Pat. No. 4,721,320 to Creps et al. discloses a Bicycle Trailer Hitch. U.S. Pat. No. 4,037,853 to Sparks discloses a Delivery Bicycle Trailer. U.S. Pat. No. 3,271,048 to A. E. Beesley et al. discloses a Sulky Vehicle Attachment for Bicycles. U.S. Pat. No. Des. 376,773 to Bell discloses a Bicycle Trailer. Lastly, U.S. Pat. No. 2,468,894 to Peek discloses a Bicycle Trailer Coupling.

In this respect, the wheelchair and trailer system according to the present invention substantially departs from the conventional concepts and designs of the prior art, and in doing so provides an apparatus primarily developed for the purpose of rolling a trailer coupled to a wheelchair.

Therefore, it can be appreciated that there exists a continuing need for a new and improved wheelchair and trailer system which can be used for rolling a trailer coupled to a wheelchair. In this regard, the present invention substantially fulfills this need.

SUMMARY OF THE INVENTION

In view of the foregoing disadvantages inherent in the known types of trailers of various designs and configurations now present in the prior art, the present invention provides an improved wheelchair and trailer system. As such, the general purpose of the present invention, which will be described subsequently in greater detail, is to provide a new and improved wheelchair and trailer system and method which has all the advantages of the prior art and none of the disadvantages.

To attain this, the present invention essentially comprises a an improved wheelchair and trailer system for rolling a trailer coupled to a wheelchair comprising a wheelchair. The wheelchair has a rearwardly extending projection with a vertical hole therethrough. The system also comprises a trailer which has a planar support which is in a generally rectangular configuration with a front edge, a rear edge and two side edges, a forwardly extending rod with an aperture therethrough postionable over the hole of the wheelchair and an associated pin to selective effect the coupling between the trailer and the wheelchair. Also provided are two rear wheels rotatable about a common horizontal axis coupled to the trailer adjacent to the rear edge. A front wheel rotatable about a horizontal axis is coupled to the trailer adjacent to the front edge. The front wheel is secured to the forwardly extending rod to allow rotation of the front wheel about a vertical axis for steering purposes. A pair of cups are provided with open tops coupled to extend outwardly from each edge of the trailer at spaced locations. Four side supports are provided, each with horizontal rails and vertical support posts. The support posts having free lower ends selectively positionable within the pairs of cups.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheelchair and trailer system which has all of the advantages of the prior art trailers of various designs and configurations and none of the disadvantages.

It is another object of the present invention to provide a new and improved wheelchair and trailer system which may be easily and efficiently manufactured and marketed.

It is further object of the present invention to provide a new and improved wheelchair and trailer system which is of durable and reliable constructions.

An even further object of the present invention is to provide a new and improved wheelchair and trailer system which is susceptible of a low cost of manufacture with regard to both materials and labor, and which accordingly is then susceptible of low prices of sale to the consuming public, thereby making such wheelchair and trailer system economically available to the buying public.

Even still another object of the present invention is to provide a wheelchair and trailer system for rolling a trailer coupled to a wheelchair.

Lastly, it is an object of the present invention to provide a new and improved wheelchair and trailer system comprising a trailer which has a planar support in a generally rectangular configuration. The trailer has a front edge, a rear edge and two side edges. Also provided is a forwardly extending rod with an aperture therethrough for positioning over the hole of the wheelchair. It also has an associated pin to selective effect the coupling between the trailer and the wheelchair. Two rear wheels are provided for rotation about a common horizontal axis coupled to the trailer adjacent to the rear edge. A front wheel is provided for rotation about a horizontal axis coupled to the trailer adjacent to the front edge. The front wheel is secured to the forwardly extending rod to allow rotation of the front wheel about a vertical axis for steering purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
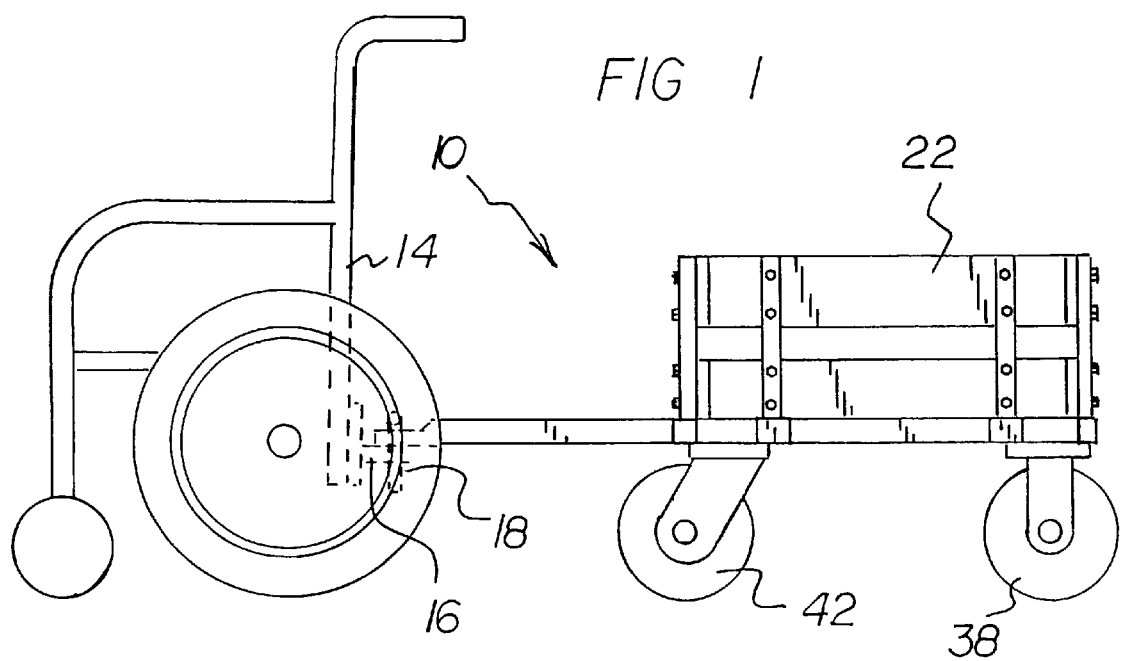
FIG. 1 is a side elevational view of the preferred embodiment of the wheelchair and trailer system constructed in accordance with the principles of the present invention.
Figure 2:
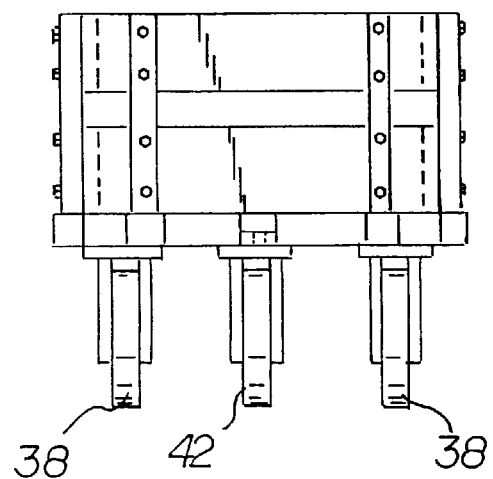
FIG. 2 is a rear elevational view of the trailer shown in FIG. 1.
Figure 3:
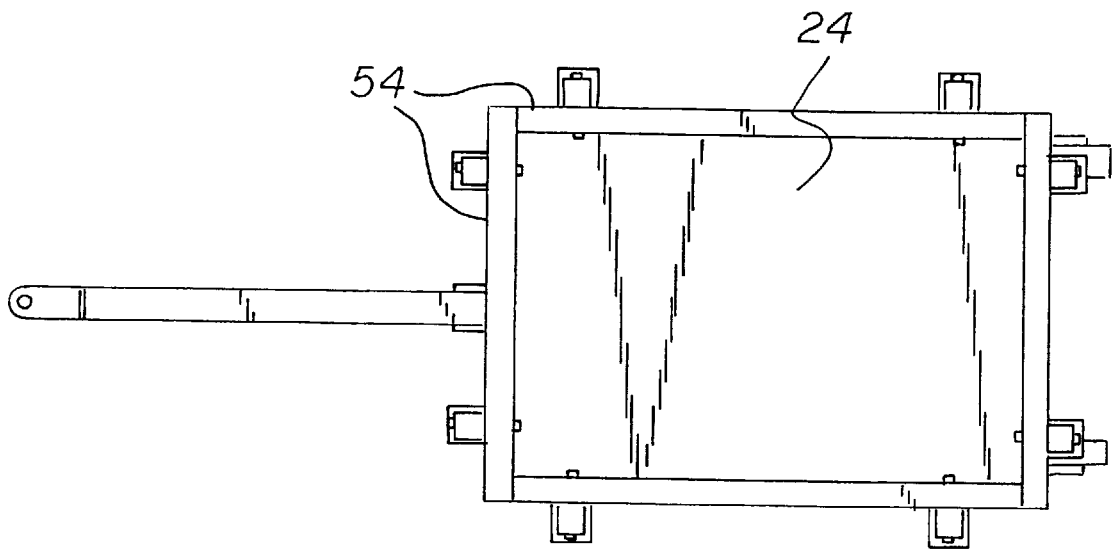
FIG. 3 is a top elevational view of the trailer shown in the prior Figures.
Figure 4:
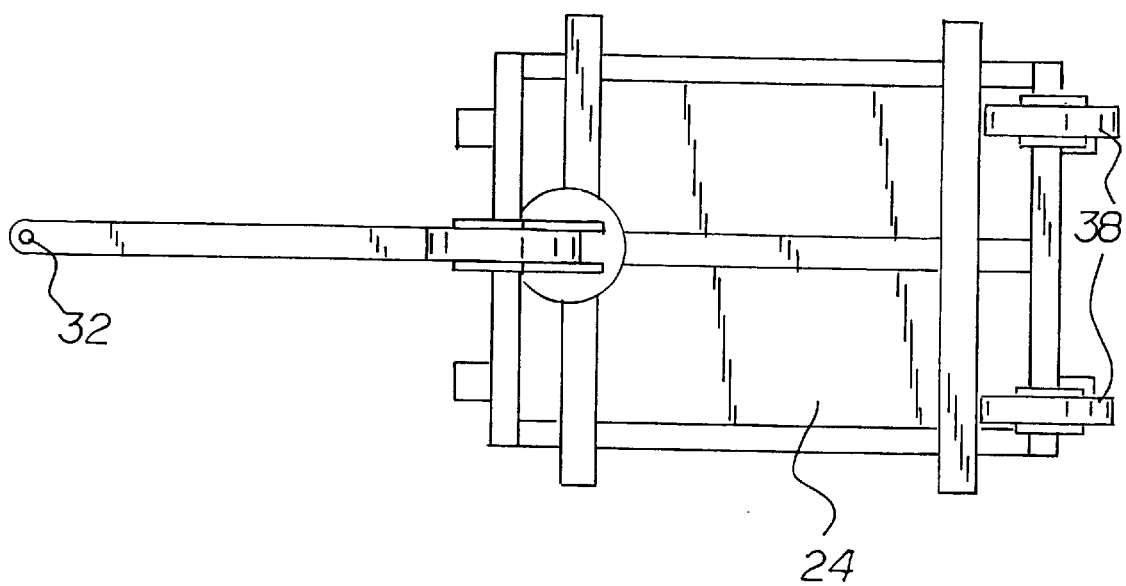
FIG. 4 is a bottom elevational view of the trailer shown in the prior Figures.
Figure 5:
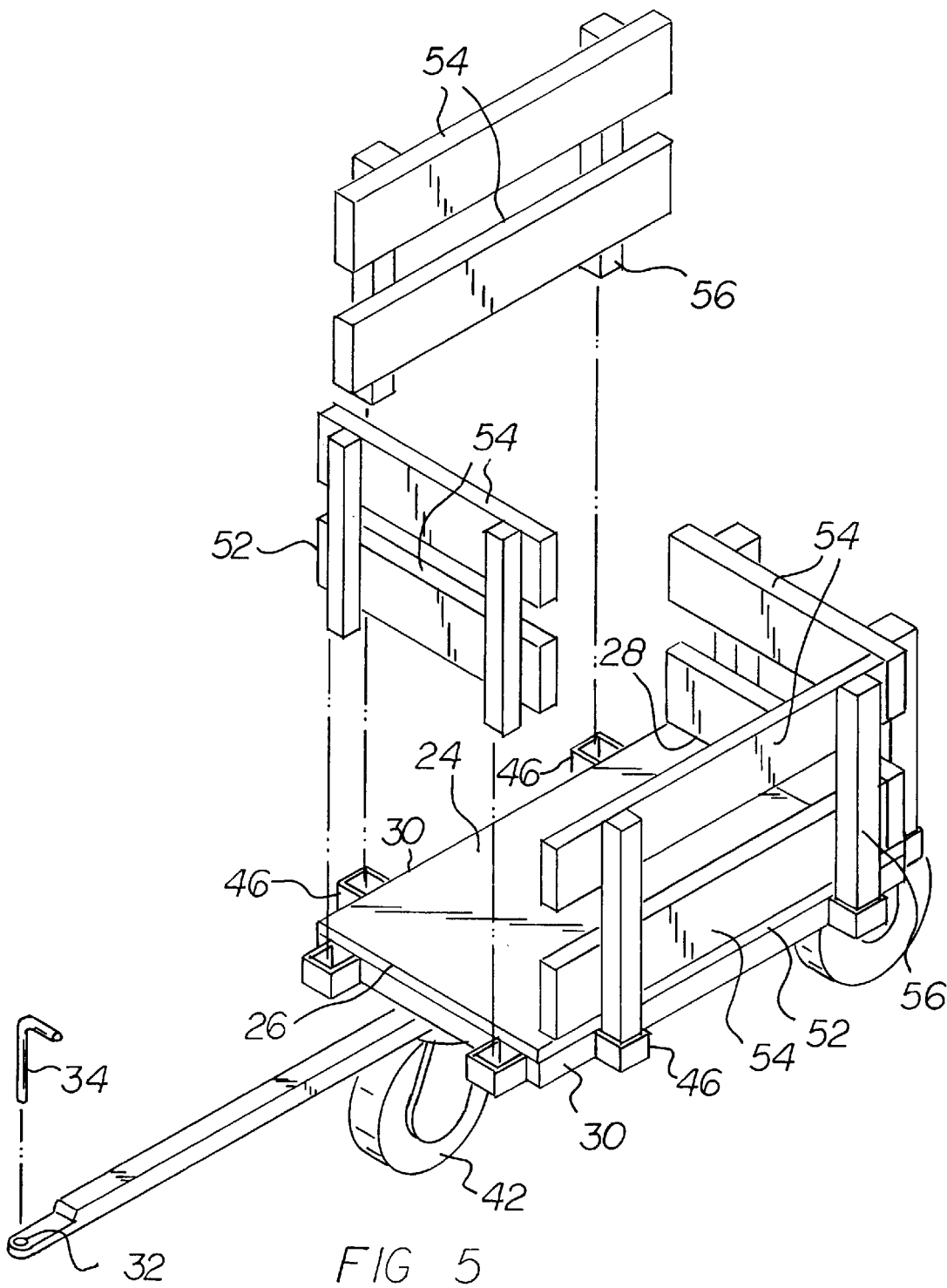
FIG. 5 is a exploded perspective view of the trailer shown in the prior Figures.

With reference now to the drawings, and in particular to FIG. 1 thereof, the preferred embodiment of the new and improved wheelchair and trailer system embodying the principles and concepts of the present invention and generally designated by the reference numeral 10 will be described.

The present invention, the wheelchair and trailer system 10 is comprised of a plurality of components. Such components are individually configured and correlated with respect to each other so as to attain the desired objective.

More specifically, the new and improved wheelchair and trailer system for rolling a trailer coupled to a wheelchair comprising a wheelchair 14. The wheelchair has a rearwardly extending projection 16 with a vertical hole 18 therethrough. The rearwardly extending projection is preferably coupled to a lower end of a rear portion of the wheelchair frame.

The system also comprises a trailer 22 which has a planar support 24 which is in a generally rectangular configuration with a front edge 26, a rear edge 28 and two side edges 30. A forwardly extending rod is provided with an aperture 32 therethrough. In use, the forwardly extending rod is postionable over the hole 18 of the wheelchair such that an associated pin 34 is deposited through the aperture and hole to selective effect the coupling between the trailer and the wheelchair.

Also provided are two rear wheels 38 rotatable about a common fixed horizontal axis. The rear wheels are mounted on forks which are in turn coupled to the trailer adjacent to the rear edge. A centered front wheel 42 rotatable about a variable horizontal axis is coupled to the trailer adjacent to the front edge. The front wheel is secured to the forwardly extending rod to allow rotation of the front wheel about a vertical axis for steering purposes.

A pair of rectangular cups 46 are provided with open tops. Such cups are coupled to a periphery of the planar support and extend outwardly from each edge of the trailer at spaced locations. Ideally, a cup is positioned adjacent each end of each of the edges of the planer support. Associated therewith are four side supports 52 each with a pair of wooden horizontal rails 54. Such horizontal rails are maintained in a parallel relationship via a pair of metallic vertical support posts 56 mounted between ends thereof. The vertical support posts have free lower ends that extend below a bottommost one of the horizontal rails for being selectively positionable within the pairs of cups.

As described hereinabove, the present invention relates to a cart designed to attach to a wheelchair. The cart is attached using a customized hitch and could be used to transport a variety of items that could not be held by a wheelchair user. The cart measures approximately 12 inches in height, 24 inches in length, and is 18 inches in width. The cart includes one center wheel at the front and two rear wheels. The sides of the cart are removable to create a flatbed carrier to attach to create a wagon carrier.

The appealing features of the present invention are its convenience, ease of use, practicality, and the health benefits such a product could offer.

The cart accessory would enable the wheelchair user to tote or carry a wide range of items that simply could not be held while maneuvering the wheelchair. This increased level of freedom and mobility allows the individual to work outside in the garden, transport large, bulky or heavy items back and forth and generally enjoy a greater degree of independence and mobility.

The cart is easy to secure and remove. The durable construction allows the attachment to be maneuvered over any terrain navigated by the wheelchair.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A wheelchair and trailer system for rolling a trailer coupled to a wheelchair comprising, in combination:

a wheelchair having a rearwardly extending projection with a vertical hole therethrough;

a trailer comprising:

a substantially planar support in a generally rectangular configuration with a front edge, a rear edge, and two side edges;

a forwardly extending rod mounted on the support adjacent to the front edge of the support, the forwardly extending rod having an aperture therethrough positionable over the hole of the wheelchair;

a pin selectively insertable through the aperture and the hole to effect coupling of the trailer to the wheelchair;

two rear wheels connected to the support and being rotatable about a common horizontal axis, the rear wheels being connected to the support adjacent to the rear edge of the support;

a front wheel connected to the support and being rotatable about a horizontal axis, the front wheel being connected to the support adjacent to the front edge, the front wheel being secured to the forwardly extending rod to allow swivel rotation of the front wheel and the forwardly extending rod as a unit about a vertical axis for steering purposes;

a pair of cups mounted on each edge of the support at spaced locations, each of the cups having an open top; and four side supports, each with horizontal rails and vertical support posts, the support posts each having a free lower end selectively positionable in one of the cups; and each of the wheels having a substantially equal diameter for maximizing stability of the trailer when the trailer is in a disconnected orientation with respect to the wheelchair, each of said wheels being in contact with a ground surface when said trailer is in a connected condition with respect to the wheelchair for minimizing towing strain imposed on said wheelchair by the trailer.

* * * * *